E. VAN NOORDEN.
Shears.

No. 199,943.      Patented Feb. 5, 1878.

WITNESSES      Ezekiel Van Noorden INVENTOR

B. W. Williams

John E. Tremmig.

By his Att'ys

Henry W. Williams Jr.

UNITED STATES PATENT OFFICE.

EZEKIEL VAN NOORDEN, OF BOSTON, MASSACHUSETTS.

IMPROVEMENT IN SHEARS.

Specification forming part of Letters Patent No. 199,943, dated February 5, 1878; application filed January 2, 1878.

*To all whom it may concern:*

Be it known that I, EZEKIEL VAN NOORDEN, of Boston, in the county of Suffolk and State of Massachusetts, have invented a new and useful Improvement in Constructing Shears, which improvement is fully set forth and described in the following specification and accompanying drawing.

This improvement, although it may be applied to any shears, is particularly useful as applied to shears for cutting sheet metal and like material.

The object of my improvement is to facilitate the cutting of the work, especially when turning, so as to change the direction of the slit produced by the cutting.

In cutting metal, or any stiff or thick substance, the work gets in the way of the blades of the shears when turning a corner or changing the direction of the cut. When a sharp turn is made, the material being operated upon, or work, projects and presses against the blade, and materially increases the labor of cutting, besides often injuring the work.

My invention consists in the peculiar construction of one or both of the blades of the shears, they being bent back, or made to fall away from the cutting-edges and from each other, so as to leave space for the material operated upon, as hereinafter more fully described and claimed.

By means of the peculiar construction of the blades of my shears this difficulty is entirely obviated, and the labor of cutting around a corner very much lessened.

Figure 1:
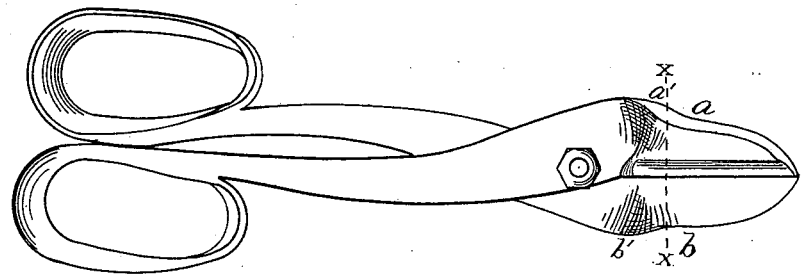
Figures 3, 4:
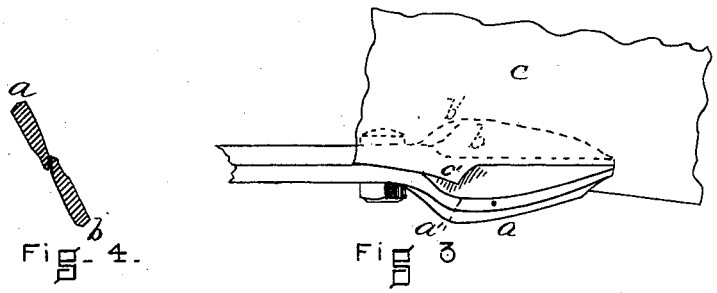
Figure 2:
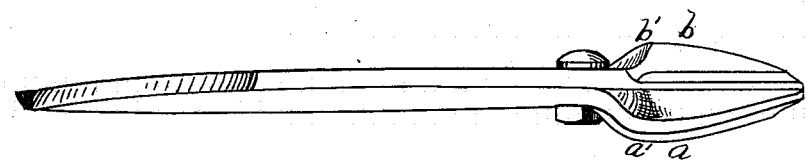

In the drawings, Figure 1 is a side elevation of a pair of shears embodying my improvement. Fig. 2 is a plan of the same. Fig. 3 is a plan view, showing the blades in the act of cutting a piece of metal, and showing the position assumed by the work as the blades are turned in cutting around a corner. Fig. 4 is a transverse section through the line $x\,x$, Fig. 1.

Similar letters of reference indicate corresponding parts.

$a\,b$ represent the two blades of the shears. $c$ is a piece of metal or other material being cut. Each of the blades $a$ and $b$ is bent back at about one-eighth inch from its cutting-edge at a short distance from the pivot.

In ordinary shears the blades shut together face to face, and parallel with each other, the entire piece of metal, of which the blade and handle are parts, being on a line and at the same angle.

In this invention the blades are bent back from and fall away from each other at a greater or less distance from the pivot which separates the blades from the handles, thus forming a curvature at the points $a'\,b'$.

As the result of such bending back or falling away of the blades $a\,b$, an ample space is provided for the work being operated upon when turning the shears. This is illustrated in Fig. 3, where the shears are just turning or changing direction, and the portion $c'$ of the work finds ample room in the curvature $a'$, which is due to the peculiar shape of the blade $a$.

A greater or less portion of the blade may be bent back in the manner shown in the drawing, as may be deemed desirable.

Having thus fully described my invention, what I claim, and desire to secure by Letters Patent, is—

A pair of shears one or both of whose blades are so constructed as to bend back or fall away from their cutting-edges and from each other, in order to provide room for the material operated upon, substantially as herein set forth.

EZEKIEL VAN NOORDEN.

Witnesses:
HENRY W. WILLIAMS,
JOHN E. TRENNING.